United States Patent [19]

Hirmer

[11] Patent Number: 5,763,050
[45] Date of Patent: Jun. 9, 1998

[54] VEHICLE SUNROOF AND METHOD OF MAKING THE SAME

[75] Inventor: Gerhard F. Hirmer, Aurora, Canada

[73] Assignee: Decoma International Inc., Aurora, Canada

[21] Appl. No.: 505,023

[22] Filed: Jul. 21, 1995

[51] Int. Cl.⁶ .................................................. B32B 1/00
[52] U.S. Cl. .................. 428/174; 428/1; 428/213; 428/412; 428/913; 296/210; 296/211; 359/265; 264/1.7; 264/241; 264/259; 264/328.1
[58] Field of Search .................................. 428/172, 174, 428/1, 213, 412, 913; 264/1.7, 241, 259, 297.1, 328.1; 296/21, 24; 359/265, 273

[56] References Cited

U.S. PATENT DOCUMENTS

| | | | |
|---|---|---|---|
| 4,045,269 | 8/1977 | Voss et al. | 428/423 |
| 5,352,504 | 10/1994 | Boulanger et al. | 428/1 |

FOREIGN PATENT DOCUMENTS

| | | |
|---|---|---|
| 0 238 164 | 9/1987 | European Pat. Off. |
| 0238164 | 9/1987 | European Pat. Off. |
| 0 590 684 | 4/1994 | European Pat. Off. |
| 0 604 750 | 7/1994 | European Pat. Off. |
| 0604750 | 7/1994 | European Pat. Off. |
| 42 38 714 | 11/1993 | Germany. |

*Primary Examiner*—Donald Loney
*Attorney, Agent, or Firm*—Pillsbury, Madison & Sutro

[57] ABSTRACT

The present invention relates to a vehicle sunroof having variable optical transmission and a method for making the same. Specifically, a vehicle sunroof is provided that, in accordance with the present invention, comprises a relatively thin film having variable optical transmission and a relatively thick substrate layer of clear plastic material adhered to a surface of the relatively thin film. The relatively thin film is positioned in a first molding die of a pair of injection molding dies such that it is adjacent a surface of the first die. The relatively thick substrate layer is adhered to one surface of the relatively thin film while in contact therewith in a molten state under heat and pressure within a cavity defined by the injection molding dies.

32 Claims, 2 Drawing Sheets

VEHICLE SUNROOF AND METHOD OF MAKING THE SAME

BACKGROUND OF THE INVENTION

1. Field of the Invention

The present invention relates to a vehicle sunroof, and in particular, to a vehicle sunroof having variable optical transmission.

2. Description of the Related Art

Motor vehicle designs, particularly passenger vehicles, are driven increasingly by concerns of fuel efficiency, weight reduction, and esthetics. Greater latitude in the curvature of vehicle panels, including sunroofs, is required to meet those concerns. Indeed, recent vehicle roof designs are incorporating sloping and rounded surfaces. Yet, the cost of producing a curved sunroof having additional functional layers like electrochromatic films is expensive. Electrochromatic materials are provided or formed typically as a planar film and are, consequently, difficult to attach to the surface of a curved sunroof. While such films can be applied to glass sunroofs, it is difficult generally to remove air bubbles between the film and the glass sunroof once the film is attached.

Yet, it is well-known that glass has been the preferred material for vehicle windows for many years. It is also well-known that plastic materials, such as polycarbonates, if employed in lieu of glass, could reduce the weight of the sunroof. Nevertheless, glass continues to be selected most often for use in vehicle windows. Apparently, therefore, the shift from glass to plastic sunroofs will follow only when plastic sunroofs offer additional advantages.

Thus, it would be advantageous to provide a cost-effective method of attaching electrochromatic films to curved, plastic sunroofs. With such an arrangement, plastic sunroofs would offer not only weight reduction, but also the ability to variably block ambient light.

SUMMARY OF THE INVENTION

Thus, an object of the present invention is to provide a vehicle sunroof having variable optical transmission and a method for making the same which provides a cost effective way of attaching electrochromatic films to sunroofs without the aforementioned problems. In accordance with the principles of the present invention, this objective is achieved by providing a vehicle sunroof comprising the combination of a relatively thin film having variable optical transmission and a relatively thick clear substrate layer. Initially, the relatively thin film is prepared or purchased and generally includes at least two layers. The first layer of the relatively thin film is a relatively thin sheet of plastic material compatible with the substrate material. For example, the relatively thin sheet of plastic material and the relatively thick substrate layer could be made of polycarbonate material. Adhered to the relatively thin sheet of plastic material, the second layer of the relatively thin film is a layer of electrochromatic material including for example, liquid crystals. Optionally, the relatively thin film can include a layer of abrasive resistant material disposed on an exposed surface of either the thin sheet of plastic material or the electrochromatic layer.

The relatively thick clear substrate layer is of a plastic material having opposed surfaces curved into a vehicle sunroof configuration. The relatively thick substrate layer is adhered to one surface of the relatively thin film while in contact therewith in a molten state under heat and pressure within a cavity defined by two generally parallel curved die surfaces of cooperating injection molding dies so that, upon solidification, the surfaces of said relatively thin film are retained in a curved configuration in generally parallel coextensive relation to corresponding curved surfaces of said relatively thick substrate layer.

The provision of injection molding the sunroof enables the use of planar films, including electrochromatic films, in making the sunroof because the relatively thin film can be attached to the substrate layer without the aforementioned problem of air bubbles forming under the film. Accordingly, another object of the present invention is to provide a method of making a sunroof having curvatures in two planes sufficient to accommodate a wide variety of designs and having an electrochromatic film incorporated therein. In the accordance with the principles of the present invention, this objective is achieved by providing a relatively thin film having electrochromatic properties and having opposed surfaces. Thereafter, the relatively thin film is mounted adjacent a curved die surface of a molding die arranged to be disposed in cooperating relation with a second molding die having a similarly shaped curved die surface. The first and second molding dies are disposed in cooperating relation so as to bring the two curved die surfaces into generally parallel relation to form a die cavity with a spacing between the two curved die surfaces substantially greater than the thickness of the relatively thin film. Finally, a clear plastic material is injection molded under heat and pressure into the die cavity formed between the two generally parallel curved die surfaces so as to form a sunroof having curved exterior surfaces including a curved relatively thin film having the electrochromatic layer adhered to a relatively thicker substrate layer of clear plastic material.

Other objects, features, and characteristics of the present invention as well as the methods of manufacture will become more apparent upon consideration of the following description and the appended claims with reference to the accompanying drawings, wherein like reference numbers designate corresponding parts in the various figures.

DETAILED DESCRIPTION OF THE PRESENTLY PREFERRED EMBODIMENTS

Figure 1:
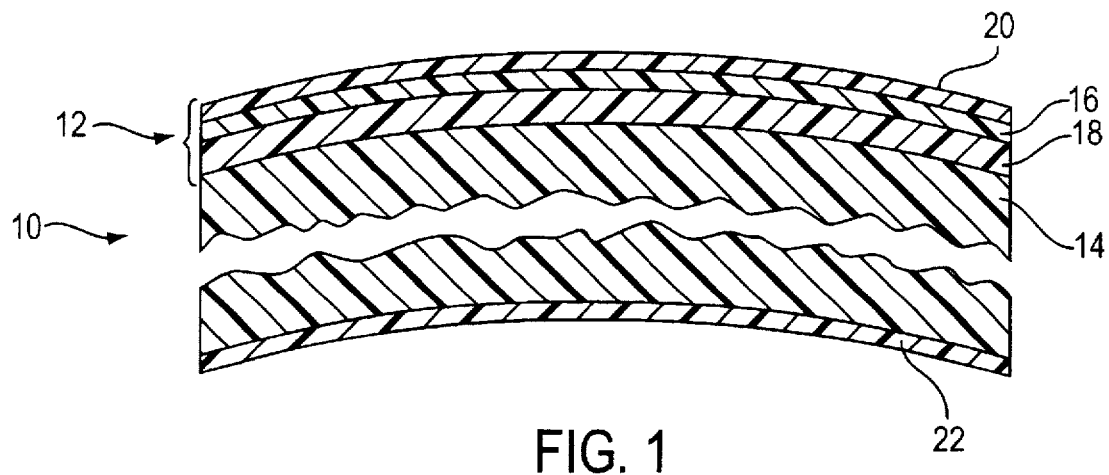
FIG. 1 is a sectional view of a first embodiment of a vehicle sunroof constructed in accordance with the principles of the present invention.
Figure 2:
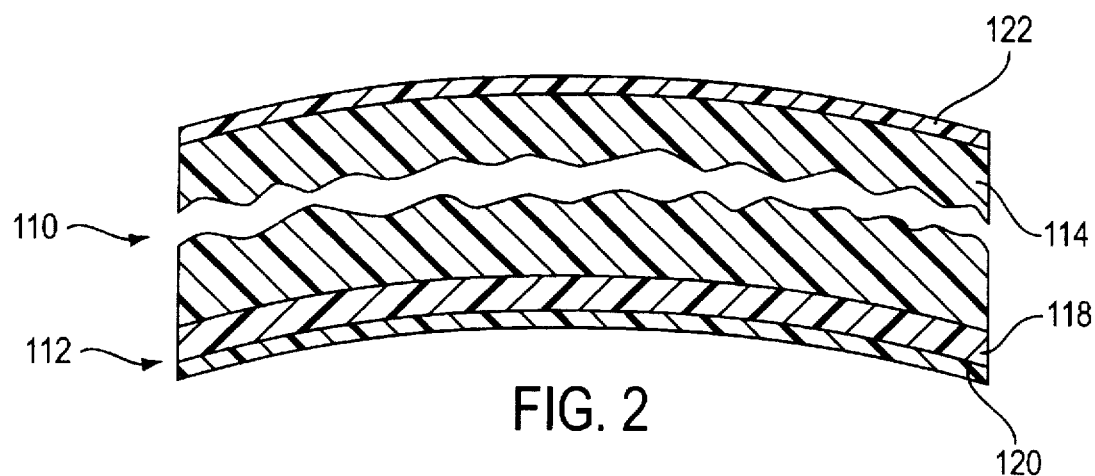
FIG. 2 is a sectional view of a second embodiment of a vehicle sunroof constructed in accordance with the principles of the present invention.
Figure 3:
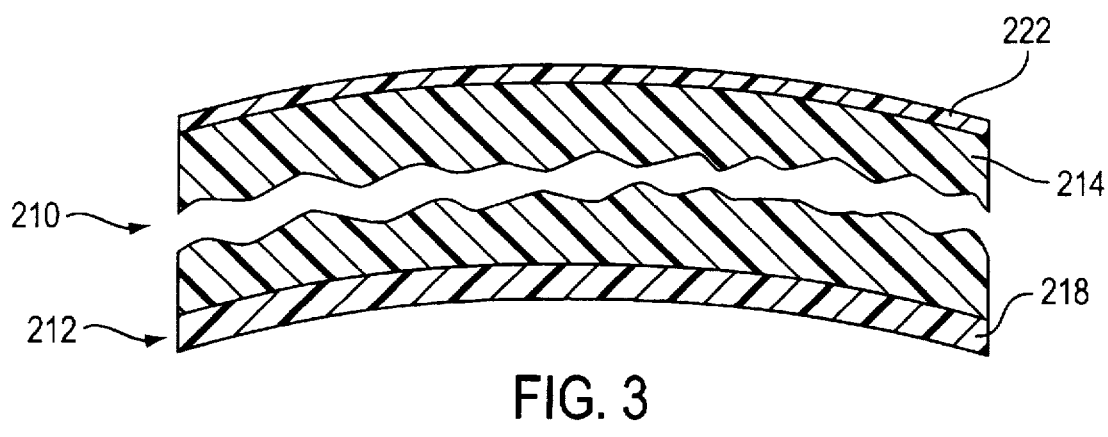
FIG. 3 is a sectional view of a third embodiment of a vehicle sunroof constructed in accordance with the principles of the present invention.

As shown in FIGS. 1–3, a vehicle sunroof in accordance with the present invention is generally indicated by the reference number 10. In the broadest concept of the invention, the sunroof consists of two layers: a relatively thin film 12 including electrochromatic material and a relatively thick substrate layer 14 of clear plastic material.

The various embodiments of the present invention include additional layers and/or different configurations.

As shown in FIG. 1, in the first embodiment of the present invention, the relatively thin film 12 includes three layers. The relatively thin film may be purchased as an assembly of three layers or the relatively thin film may be assembled prior to further processing. Notwithstanding, the three layers include a relatively thin sheet of plastic material 16, a relatively thin material 18 having variable optical transmission, and a layer of abrasive resistant material 20. The relatively thin sheet 16 is formed from any suitable thermoplastic material. Preferred materials are taken from the group consisting of polycarbonate or polyester resin, with polycarbonate being a preferred embodiment. The relatively thin material 18 having variable optical transmission is adhered to one surface of the relatively thin sheet 16. The relatively thin material 18 having variable optical transmission is formed from any suitable electrochromatic film. Preferred films would have liquid crystals. Finally, the relatively thin film 12 includes preferably a layer of abrasive resistant material 20 adhered to the other surface of the relatively thin sheet 16 such that it constitutes an exterior surface of the sunroof 10. The abrasive resistant material 20 preferably comprises a thermoset material taken from the group consisting of polysiloxane, acrylic resin, or aliphatic polyurethane. As constructed and arranged in the first embodiment, the relatively thin film 12 has a thickness, including any abrasion resistant material if applied, within an operative range of 0.2 to 2.0 millimeters and a preferred range of 0.2 to 1.0 millimeter. A preferred thickness for the relatively thin film 12 is approximately 0.5 millimeters.

As described above, the abrasive resistant material 20 is adhered preferably to the surface of the relatively thin sheet 16 opposing the surface which adjoins the relatively thin material 18 having variable optical transmission. The abrasive resistant material 20 is applied before the relatively thin film 12 is adhered to a relatively thick substrate layer 14 and preferably by a spraying procedure. In the alternative, the abrasion resistant material 20 as well as an abrasion resistant material 22 disposed on an inwardly facing surface of the sunroof 10 can be applied to the sunroof 10 by a dipping procedure following attachment of the relatively thin film 12 to the substrate layer 14. These procedures have the effect of coating an exterior surface of the sunroof with the abrasive resistant material 20. Additionally, both abrasion resistant materials 20, 22 can be applied by spraying following attachment of the relatively thin film 12 to the substrate layer 14. If only one abrasive resistant coating is incorporated in the sun roof, however, it preferably should be disposed on the surface of the sunroof 10 that forms part of the exterior roof of a vehicle. As configured, the abrasive resistant material 20 provides wear resistance as well as resistance to ultraviolet radiation.

Figure 6:
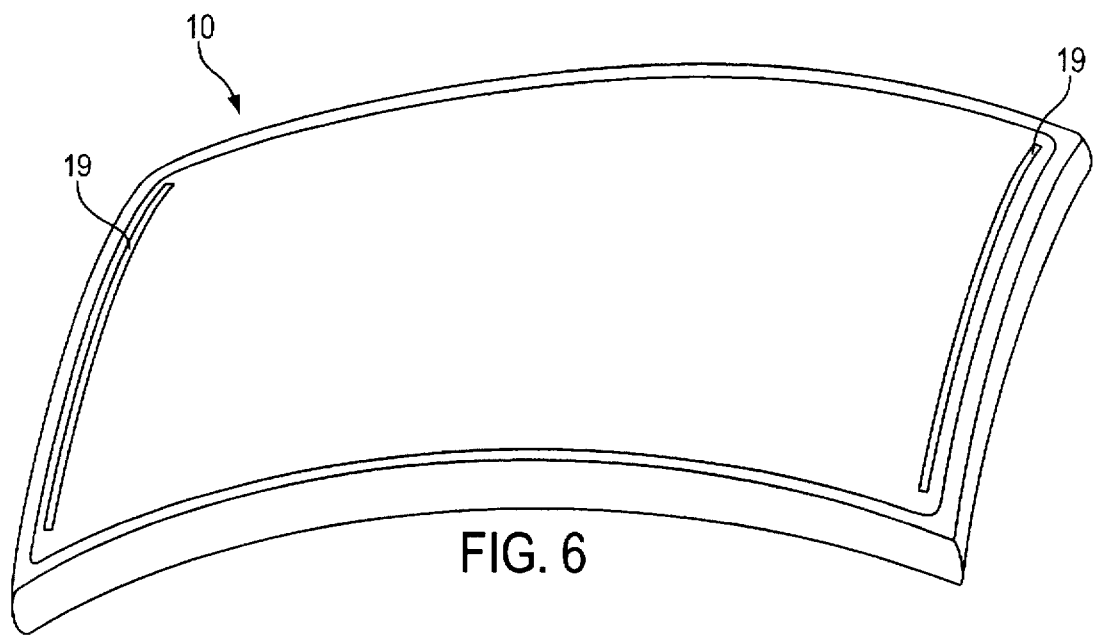
FIG. 6 is a perspective view of a vehicle sunroof in accordance with the principles of the present invention.

The electrochromatic film forming the relatively thin material 18 having variable optical transmission changes opacity as voltage is applied across the film. As shown in FIG. 6, buss bars 19 are disposed along the perimeter of the electrochromatic film. Voltage from a vehicle power supply is applied across the buss bars 19 to change the opacity of the film.

A relatively thick substrate layer 14 is disposed in adjoining relationship to the relatively thin film 12. The relatively thick substrate layer 14 is preferably formed from thermoplastic material taken from the group consisting of polycarbonate, cyclic polyolefin, and polymethyl methacrylate. A preferred material is polycarbonate. The relatively thick substrate layer 14 has a thickness within an operative range of 3 to 13 millimeters, and a preferred range of 3 to 7 millimeters. A preferred thickness of the relatively thick substrate layer is approximately 5 millimeters.

As shown in FIG. 1, in the first embodiment, the sunroof 10 may include optionally the additional abrasion resistant coating 22 on the inwardly facing surface of the sunroof 10— i.e. the surface of the sunroof 10 that upon installation in a vehicle faces an interior of the vehicle. In this case, the abrasion resistant materials 20, 22 are applied by a dipping procedure.

Figure 4:
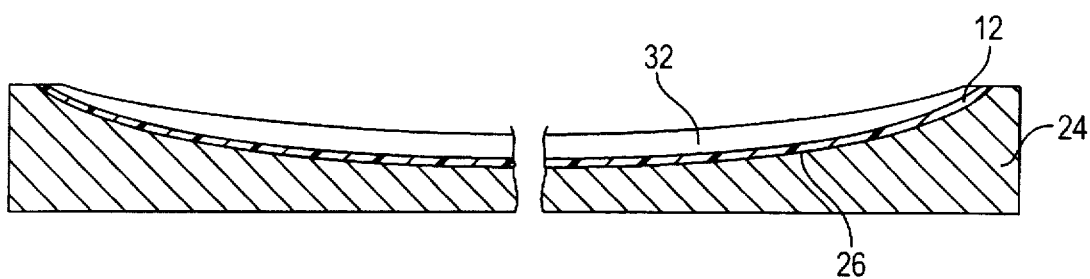
FIG. 4 is a generally schematic view illustrating a step in the process of making the sunroofs shown in FIGS. 1–3.
Figure 5:
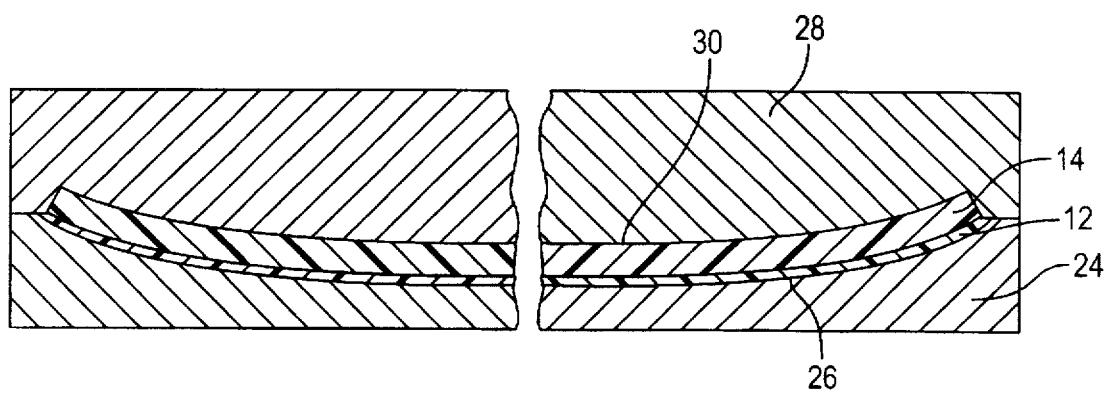
FIG. 5 is a generally schematic view illustrating a further step in the method.

FIGS. 4–5 illustrate the method of making a sunroof in accordance with the present invention. The relatively thin film 12 is prepared by printing, laminating or bonding the relatively thin material 18 having variable optical transmission to the relatively thin sheet 16 with an adhesive appropriate for the materials. As discussed above, the abrasion resistant coating 20 may be sprayed onto the thin film 12 prior to attachment of the thin film to the substrate 14, the coating 20 may applied by a dipping procedure after the substrate 14 is attached to the thin film 12.

Following attachment of the relatively thin material 18 having variable optical transmission to the relatively thin sheet 16 (thereby forming the relatively thin film 12), the relatively thin film 12 is then mounted within a molding die 24, such as shown in FIG. 4. The molding die 24 includes a curved die surface 26, and the relatively thin film 12 is mounted with respect to the molding die 24 so that it is adjacent to the curved surface 26. In this embodiment, the relatively thin sheet of plastic material 16, or the abrasive resistant material 20 if one is used, of the relatively thin film 12 is mounted adjacent the curved surface 26 of the die 24 such that the relatively thin material 18 having variable optical transmission is disposed interior of the relatively thin sheet 16. As indicated by FIG. 6, the curved surface 26 may have curvature in two planes—a prevalent practice with respect to vehicle sunroofs.

It is contemplated that the relatively thin film 12 has a thickness which when mounted in the molding die 24 would conform simply and generally to the curved die surface 26. Preferably, the relatively thin film 12 is mounted within the molding die 24 adjacent the die surface 26 so that a marginal edge extends past the die surface 26. The outwardly extending marginal edge portion of the relatively thin film 12 is engaged by a cooperating marginal edge of a second molding die 28 which cooperates with the molding die 24 when moved into cooperating relation with the die 24.

As best shown in FIG. 5, the cooperating molding die 28 includes a curved die surface 30 which is generally parallel with the curved die surface 26 of the molding die 24. The curved die surfaces 26 and 30 form a die cavity 32 when the molding dies 24 and 28 are moved into cooperating relation. The die cavity 32 has a thickness between the curved die surfaces 26 and 30 which is substantially greater than the thickness of the relatively thin film 12.

After the die members have been moved into cooperating relation, the plastic material which is to form the substrate layer 14 is injected into the die cavity 32 above the relatively thin sheet 16 and molded under heat and pressure in accordance with conventional practice. During the injection molding, the surface of the relatively thin film 12 adjacent the die surface 26 is forced against the die surface 26 thereby assuring a proper surface configuration. Optionally, the relatively thin film 12 can be preformed prior to engagement of the molding dies 24 and 28.

The resulting sunroof 10, as shown in FIG. 6, includes exterior surfaces which are curved to conform with the die surfaces 26 and 30. The relatively thin material 18 having variable optical transmission is captured between the relatively thin sheet 16 and the relatively thick substrate layer 14 which now has a curvature corresponding to that of the molding dies 24 and 28, and such layers are retained in the curved configuration by their adherence to each other.

As shown in FIG. 2, a second embodiment of the present invention is designated generally by the reference number 110. In this configuration, a relatively thick substrate layer 114 is disposed between an abrasive resistant material 122 and a relatively thin film 112 having variable optical transmission. In this embodiment, the relatively thin film 112 including the material 118 having variable optical transmission does not include a relatively thin sheet, but it does include an abrasive resistant material 120. The abrasion resistant materials 122, 120 are applied as described above by spraying or dipping. The second embodiment of the present invention is assembled as described above except that the relatively thin film 112 is mounted on the cooperating molding die 28 rather than the molding die 24.

Finally, as shown in FIG. 3, a third embodiment of the present invention designated generally by the reference number 210. This embodiment is identical to the previous embodiment except for the deletion of an abrasive resistant material on the exterior surface of the relatively thin film 212.

While the invention has been described in connection with the preferred embodiments, it should be understood readily that the present invention is not limited to the disclosed embodiments. Rather, the present invention is intended to cover various equivalent arrangements including, for example, a sunroof comprised of a relatively thin film having variable optical transmission and a relatively thick substrate layer adhered thereto and other arrangements included within the scope of the appended claims.

What is claimed is:

1. A vehicle sunroof comprising:
   a relatively thin film preform comprising a relatively thin sheet of clear plastic material and a relatively thin material layer having a variable optical transmission such that its opacity changes as voltage is applied thereto, said relatively thin film having opposed surfaces; and
   a relatively thick substrate layer being relatively thicker in comparison with said relatively thin film and made of clear plastic material having opposed surfaces curved into a vehicle sunroof configuration,
   said relatively thin sheet and said relatively thick substrate layer being formed from a same type of clear plastic material
   said relatively thick substrate layer being adhered to one surface of said relatively thin film while in contact therewith in a molten state under heat and pressure within a cavity defined by two generally parallel curved die surfaces of cooperating injection molding dies so that upon solidification the surfaces of said relative thin film are retained in a curved configuration in generally parallel coextensive relation to corresponding curved surfaces of said relatively thick substrate layer.

2. A vehicle sunroof according to claim 1, wherein said relatively thin material layer is an electrochromatic film.

3. A vehicle sunroof according to claim 1, wherein said relatively thin material layer comprises liquid crystals.

4. A vehicle sunroof according to claim 2, wherein said relatively thin sheet of clear plastic material is adhered to the relatively thin material layer of electrochromatic film while the one surface is in a planar condition.

5. A vehicle sunroof according to claim 1, further comprising an abrasive resistant material adhered to a surface of one of said relatively thin film and said relatively thick substrate opposed to said contacting surfaces of said relatively thin film and said relatively thick substrate.

6. A vehicle sunroof according to claim 5, wherein said abrasive resistant material is an exterior surface of said sunroof.

7. A vehicle sunroof according to claim 5, wherein said abrasive resistant material is a thermoset material taken from the group consisting of polysiloxane, acrylic resin, or aliphatic polyurethane.

8. A vehicle sunroof according to claim 1, wherein said relatively thin film has a thickness within a range of 0.2 to 2.0 mm.

9. A vehicle sunroof according to claim 1, wherein said relatively thin film has a thickness within a range of 0.2 to 1.0 mm.

10. A vehicle sunroof according to claim 1, wherein said relatively thin film has a thickness of approximately 0.5 mm.

11. A vehicle sunroof according to claim 1, wherein said relatively thick substrate layer has a thickness within a range of 3 to 12 mm.

12. A vehicle sunroof according to claim 10, wherein said relatively thick substrate layer has a thickness within a range of 3 to 7 mm.

13. A vehicle sunroof according to claim 1, wherein said relatively thick substrate layer has a thickness approximately 5 mm.

14. A vehicle sunroof according to claim 1, wherein said relatively thin sheet is formed from a thermoplastic material taken from the group consisting of polycarbonate or polyester resin.

15. A vehicle sunroof according to claim 1, wherein said relatively thick substrate layer is formed of a thermoplastic material taken from the group consisting of polycarbonate, cyclic polyolefin or polymethyl methacrylate or any modification thereof.

16. A method of forming a vehicle sunroof having variable optical transmission comprising:
   providing a relatively thin film preform comprising a relatively thin sheet of clear plastic material and a relatively thin material layer having variable optical transmission such that its opacity changes as voltage is applied thereto, said relatively thin film having opposed surfaces;
   mounting said relatively thin film preform, including said relatively thin sheet of clear plastic material and said relatively thin material layer having variable optical transmission, adjacent a curved die surface of a molding die arranged to be disposed in cooperating relation with a second molding die having a similarly shaped curved die surface;
   disposing the first and second molding dies in cooperating relation so as to bring the two curved die surfaces into generally parallel relation to form a die cavity with a spacing between the two curved die surfaces substantially greater than the thickness of said relatively thin film; and
   injection molding a clear plastic material of a same type as said clear plastic material of said relatively thin sheet under heat and pressure within the die cavity between the two generally parallel curved die surfaces so as to form a molded clear plastic material adhered to said relatively thin film, said molded clear plastic material and said adhered relatively thin film constituting a sunroof having curved surfaces conforming to the two curved die surfaces of said molding dies, said sunroof comprising said relatively thin film, including said relatively thin sheet of clear plastic material and said relatively thin material layer having said variable optical transmission, and a relatively thicker substrate layer comprising said clear plastic material molded in adhered relation to said relatively thin film, said relatively thicker substrate layer being relatively thicker in comparison with said relatively thin film.

17. A method of forming a vehicle sunroof according to claim 16, further comprising adhering said relatively thin sheet of clear plastic material to said relatively thin material layer having said variable optical transmission while said relatively thin sheet is in a substantially planar condition.

18. A method of forming a vehicle sunroof according to claim 16, further comprising coating with an abrasive resistant material a particular surface of one of said relatively thin film and said relatively thick substrate, which particular surface is opposed to a surface adjoining said relatively thin film and said relatively thick substrate.

19. A method of forming a vehicle sunroof according to claim 18, wherein said abrasive resistant material is coated on an exterior surface of said vehicle sunroof.

20. A method of forming a vehicle sunroof according to claim 18, wherein said abrasive resistant material is a thermoset material taken from the group consisting of polysiloxane, acrylic resin, or aliphatic polyurethane.

21. A method of forming a vehicle sunroof according to claim 16, wherein said relatively thin film has a thickness within a range of 0.2 to 2.0 mm.

22. A method of forming a vehicle according to claim 16, wherein said relatively thin film has a thickness within a range of 0.2 to 1.0 mm.

23. A method of forming a vehicle sunroof according to claim 16, wherein said relatively thin film has a thickness of approximately 0.5 mm.

24. A method of forming a vehicle sunroof according to claim 16, wherein said relatively thick substrate layer has a thickness within a range of 3 to 12 mm.

25. A method of forming a vehicle sunroof according to claim 16, wherein said relatively thick substrate layer has a thickness within a range of 3 to 7 mm.

26. A method of forming a vehicle according to claim 16, wherein said relatively thick substrate layer has a thickness approximately 5 mm.

27. A method of forming a vehicle sunroof according to claim 16, wherein said relatively thick substrate layer is formed of a thermoplastic material taken from the group consisting of polycarbonate, cyclic polyolefin, or polymethyl methacrylate or any modification thereof.

28. A method of forming a vehicle sunroof according to claim 16, wherein said relatively thin sheet is formed from a thermoplastic material taken from the group consisting of polycarbonate or polyester resin.

29. A method of forming a vehicle sunroof according to claim 16, wherein said relatively thin material layer is an electrochromatic film.

30. A method for forming a vehicle sunroof according to claim 16, wherein said relatively thin material layer comprises liquid crystals.

31. A vehicle sunroof according to claim 1, wherein said relatively thin sheet of clear plastic material comprises polycarbonate and wherein said relatively thick substrate layer comprises polycarbonate.

32. A method according to claim 16, wherein said relatively thin sheet of clear plastic material of said thin film preform comprises polycarbonate, and wherein said injection molding is accomplished by injecting said clear plastic material in the form of polycarbonate.

* * * * *